S. WALLACH.

CLASP FOR BRACELETS.

No. 10,552. Reissued Jan. 13, 1885.

Witnesses

Chas. N. Smith

Geo. T. Pinckney

Inventor

Samuel Wallach per Lemuel W. Serrell atty.

N. PETERS, Photo-Lithographer, Washington, D. C.

UNITED STATES PATENT OFFICE.

SAMUEL WALLACH, OF NEW YOKK, N. Y.

CLASP FOR BRACELETS.

SPECIFICATION forming part of Reissued Letters Patent No. 10,552, dated January 13, 1885.

Original No. 293,825, dated February 19, 1884. Application for reissue filed August 20, 1884.

*To all whom it may concern:*

Be it known that I, SAMUEL WALLACH, of the city and State of New York have invented an Improvement in Clasps for Bracelets, of which the following is a specification.

Bracelets have heretofore been made of ornamental flat chains, and usually the chain of each bracelet is fastened at one end to an ornamental center piece, and the other end comes around and passes through the same center piece, and friction is applied so that the chain can be drawn along in the slide to enlarge the bracelet for allowing it to be passed over the hand, then the chain is drawn up to tighten it around the wrist. There is hence a free end of the chain, which hangs down and is very inconvenient, and the party wearing the bracelet usually needs assistance in drawing up the chain around the wrist.

My invention is intended for fastening the chain in a very strong and reliable manner, and for allowing the same to be enlarged or contracted to fit any wrist of ordinary size.

Figure 3:
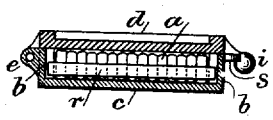
Figure 2:
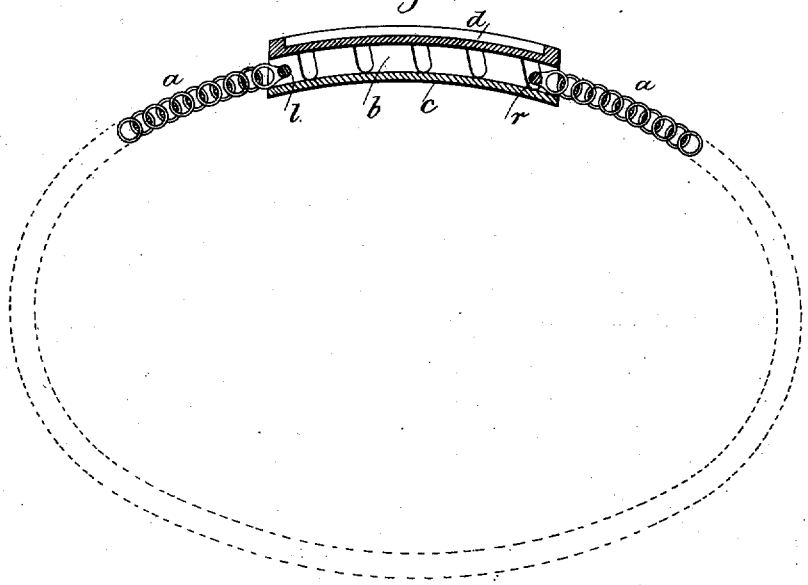
Figure 1:
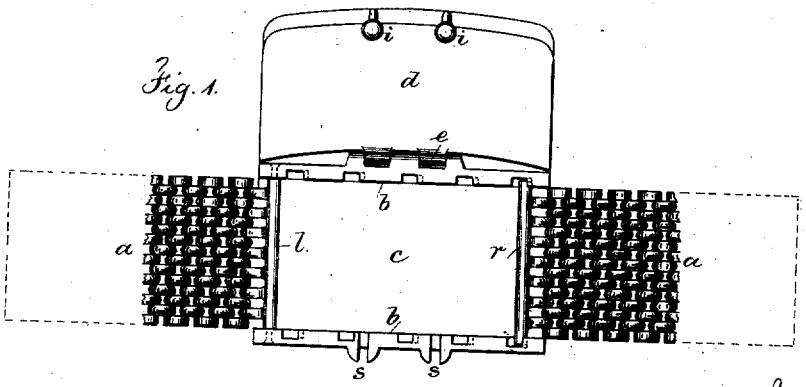

In the drawings, Figure 1 is a plan view of the fastening as open. Fig. 2 is a section of the same, and Fig. 3 is a cross-section of the clasp.

The chain *a* is to be of any desired character. I have represented it as of rings closely set together, as usual in making these chains. The clasp that receives the ends of the chain is to be of any ornamental shape; but it is hollow, having a bottom, *c*, sides *b b*, and top or lid *d*, which lid is hinged at *e*, and can be opened or closed, there being a spring-catch to hold the same closed. Usually the balls *i i* press against the ends of the prongs *s*, and their centers pass slightly below such prongs, so as to require the application of some little force to spring the lid open or to close it. The clasp is open at the ends for the reception of the chain, and one end of the chain is held firmly within the clasp by a pin, *l*, passing through the links, or in any other suitable manner. The other end of the chain is free and adapted to be passed into and to catch within the clasp when the lid is open. I have shown the chain as terminating in a cross-bar, *r*, that is longer than the width of the chain, and there are in the sides *b b* notches or recesses to receive the ends of the cross-bar. These notches should be inclined downwardly and backwardly, so that the bracelet will be held after the cross-bar has been entered at its ends into the two corresponding notches, the tension on the bracelet tending to draw the cross-bar down into the bottom portions of the notches, and there are to be two, three, or more pairs of these notches in the inner opposite faces of the sides *b b*, so that the bracelet can be shortened by moving the end nearer to the pin *l*. When the bracelet has been placed around the wrist and the cross-bar passed into its proper notches, the cover is to be closed, and the chain is thus firmly secured, so that it is not liable to become disconnected accidentally, and a very convenient and handsome article is produced, which is free from the objections heretofore arising in relation to chain bracelets.

I claim as my invention—

1. The combination, with the bracelet-chain, and its end piece, of a clasp or center-piece having a bottom, sides, and hinged cover, and slots within the box for receiving and holding the end piece of the chain, substantially as specified.

2. The combination, with the bracelet-chain, of a fastening device attached to and projecting from the loose end of the chain, a clasp or center piece to which the other end of the chain is attached, a cover for the center piece, and holding devices within the clasp for the fastening that projects from the loose end of the chain, substantially as set forth.

3. The combination, with the flat bracelet-chain, of a clasp having a bottom, sides, and a hinged cover, there being grooves in the inner surfaces of the sides, and a cross-bar at the end of the chain passing into such grooves, substantially as set forth.

4. The bracelet-chain having a cross-bar at one end and an attaching-pin at the other end, in combination with a clasp that is provided with a movable cover, and inclined grooves in the opposite faces of the clasp to receive the ends of the cross-bar, substantially as set forth.

Signed by me this 11th day of August, A. D. 1884.

SAMUEL WALLACH.

Witnesses:
GEO. T. PINCKNEY,
WILLIAM G. MOTT.